(12) United States Patent
Army et al.

(10) Patent No.: US 12,479,581 B2
(45) Date of Patent: Nov. 25, 2025

(54) CABIN AIR COMPRESSOR WITH INTEGRAL HEAT EXCHANGER

(71) Applicant: Hamilton Sundstrand Corporation, Charlotte, NC (US)

(72) Inventors: Donald E. Army, Enfield, CT (US); Louis J. Bruno, Ellington, CT (US); Aiden Coutin, Ogden, UT (US); Jeffrey Ernst, Wethersfield, CT (US); Kayla Gosse, Ellington, CT (US); Erin G. Kline, Vernon, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 553 days.

(21) Appl. No.: 17/946,655

(22) Filed: Sep. 16, 2022

(65) Prior Publication Data
US 2023/0399112 A1  Dec. 14, 2023

Related U.S. Application Data

(60) Provisional application No. 63/351,090, filed on Jun. 10, 2022.

(51) Int. Cl.
*B64D 13/08* (2006.01)
(52) U.S. Cl.
CPC .................. *B64D 13/08* (2013.01)
(58) Field of Classification Search
CPC ...................................................... B60D 13/08
USPC ........................................................ 454/76
See application file for complete search history.

(56) References Cited

U.S. PATENT DOCUMENTS

| | | | |
|---|---|---|---|
| 2,958,211 A | 11/1960 | Griffith | |
| 6,681,592 B1 * | 1/2004 | Lents | B64D 13/06 62/401 |
| 9,598,175 B2 * | 3/2017 | DeValve | F25B 11/00 |
| 9,669,936 B1 | 6/2017 | Fiterman et al. | |
| 10,533,784 B2 * | 1/2020 | Army | B64D 13/06 |
| 10,934,007 B2 * | 3/2021 | Ho | B64D 13/08 |
| 11,084,592 B2 | 8/2021 | Bruno et al. | |
| 11,339,800 B2 * | 5/2022 | Sakota | F01D 17/141 |
| 11,661,197 B2 * | 5/2023 | Lo | B64D 13/02 454/76 |
| 2014/0331857 A1 * | 11/2014 | Massey | B64D 37/32 95/35 |

(Continued)

FOREIGN PATENT DOCUMENTS

| | | |
|---|---|---|
| GB | 831742 A | 3/1960 |
| KR | 102099423 B1 | 4/2020 |

OTHER PUBLICATIONS

Extended European Search Report for European Application No. 23177381.3; Report Mail Date Oct. 13, 2023 (11 Pages).

*Primary Examiner* — Avinash A Savani
*Assistant Examiner* — Dana K Tighe
(74) *Attorney, Agent, or Firm* — CANTOR COLBURN LLP

(57) ABSTRACT

An environmental control system of a vehicle includes a compressor having a compressor inlet configured to receive a first medium and a compressor outlet. A compressed first medium is provided at the compressor outlet. A conduit is configured to receive a second medium and a heat exchanger is mounted to the compressor. The heat exchanger is fluidly connected to a portion of the compressor and to the conduit.

18 Claims, 7 Drawing Sheets

(56) References Cited

U.S. PATENT DOCUMENTS

2018/0370636 A1    12/2018  Laborde et al.
2021/0053687 A1*  2/2021  Bruno .................... B64D 13/04

* cited by examiner

CABIN AIR COMPRESSOR WITH INTEGRAL HEAT EXCHANGER

CROSS-REFERENCE TO RELATED APPLICATIONS

This application claims the benefit of U.S. Provisional Application No. 63/351,090 filed Jun. 10, 2022, the disclosure of which is incorporated herein by reference in its entirety.

BACKGROUND

Embodiments of the disclosure relate to environmental control systems, and more specifically to an environmental control system of an aircraft.

In general, contemporary air condition systems are supplied a pressure at cruise that is approximately 30 psig to 35 psig. The trend in the aerospace industry today is towards systems with higher efficiency. One approach to improve airplane efficiency is to eliminate the bleed air entirely and use electrical power to compress outside air. A second approach is to use lower engine pressure. The third approach is to use the energy in the bleed air to compress outside air and bring it into the cabin.

Air conditioning systems commonly used on an aircraft may be driven by pressurized air suppled from a cabin air compressor. Air drawn from a source is delivered to a cabin air compressor for compression therein. The compressed air output from cabin air compressor then passes through a series of heat exchangers, an air cycle machine, and a water separator where the air is cooled and dehumidified. The resulting cool dry air is provided to the cabin, flight deck, and one or more other systems of the aircraft.

SUMMARY

According to an embodiment, an environmental control system of a vehicle includes a compressor having a compressor inlet configured to receive a first medium and a compressor outlet. A compressed first medium is provided at the compressor outlet. A conduit is configured to receive a second medium and a heat exchanger is mounted to the compressor. The heat exchanger is fluidly connected to a portion of the compressor and to the conduit.

In addition to one or more of the features described above, or as an alternative, in further embodiments the compressor further comprises a compressor housing, the heat exchanger being mounted to the compressor housing.

In addition to one or more of the features described above, or as an alternative, in further embodiments the heat exchanger is integrally formed with the compressor housing.

In addition to one or more of the features described above, or as an alternative, in further embodiments the compressor further comprises a rotating portion arranged within the compressor housing, the heat exchanger being mounted to the compressor between the rotating portion and an outlet of the compressor.

In addition to one or more of the features described above, or as an alternative, in further embodiments the compressor further comprises a volute formed within the compressor housing, the heat exchanger being mounted to the compressor between the volute and an outlet of the compressor.

In addition to one or more of the features described above, or as an alternative, in further embodiments the heat exchanger further comprises a plate and at least one fin extending from the plate.

In addition to one or more of the features described above, or as an alternative, in further embodiments the at least one fin includes a plurality of first fins, the plurality of first fins being arranged within the compressor housing.

In addition to one or more of the features described above, or as an alternative, in further embodiments the at least one fin further comprises a plurality of second fins, the plurality of second fins being arranged within the conduit.

In addition to one or more of the features described above, or as an alternative, in further embodiments the at least one fin includes a plurality of second fins, the plurality of second fins being arranged within the conduit.

In addition to one or more of the features described above, or as an alternative, in further embodiments the compressor is part of a cabin air compressor.

In addition to one or more of the features described above, or as an alternative, in further embodiments the compressor is part of a thermodynamic device.

In addition to one or more of the features described above, or as an alternative, in further embodiments the first medium is fresh air.

In addition to one or more of the features described above, or as an alternative, in further embodiments the second medium is cabin air.

In addition to one or more of the features described above, or as an alternative, in further embodiments the vehicle is an aircraft.

According to an embodiment, a method of operating an environmental control system of a vehicle includes compressing a first medium at a compressor to form a compressed first medium, extracting energy from a second medium at a turbine, and heating the second medium within a heat exchanger using the compressed first medium. Heating the second medium occurs prior to the extracting energy from the second medium.

In addition to one or more of the features described above, or as an alternative, in further embodiments the first medium is fresh air.

In addition to one or more of the features described above, or as an alternative, in further embodiments the second medium is cabin air.

In addition to one or more of the features described above, or as an alternative, in further embodiments comprising providing the compressed first medium to an environmental control system pack, the environmental control system pack being located downstream from the compressor relative to a flow of the first medium.

In addition to one or more of the features described above, or as an alternative, in further embodiments comprising providing the first medium to an environmental control system pack, wherein the compressor is part of the environmental control system pack.

In addition to one or more of the features described above, or as an alternative, in further embodiments the vehicle is an aircraft.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1A:
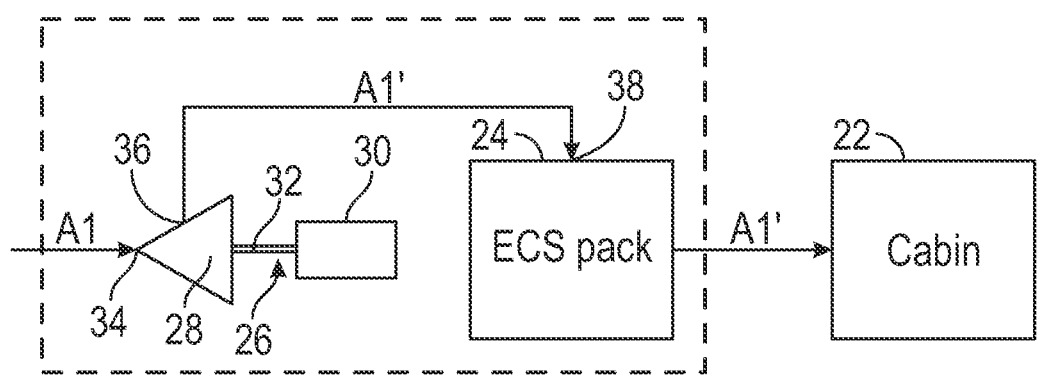
FIG. 1A is schematic diagram of an environmental control system of an aircraft according to an embodiment.
Figure 1B:
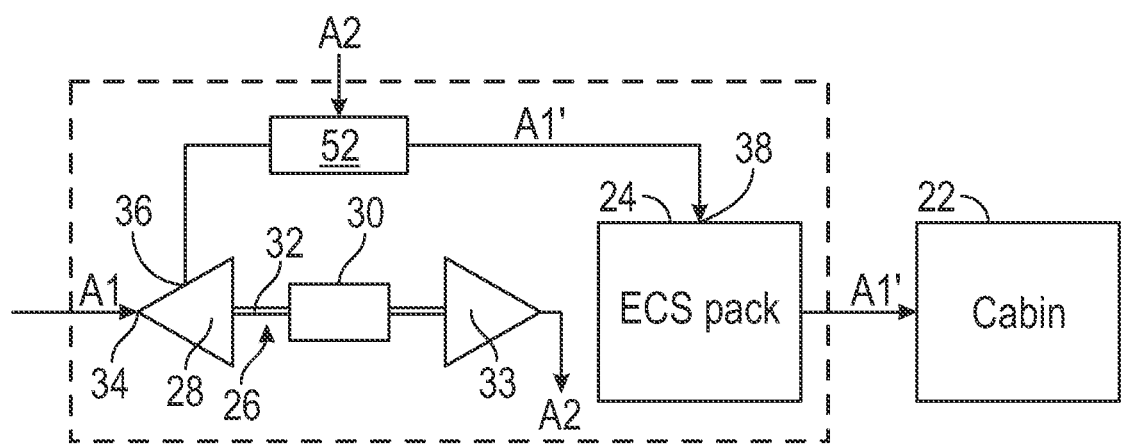
FIG. 1B is schematic diagram of an environmental control system of an aircraft according to an embodiment.

With reference to FIG. 1A, an environmental control system (ECS) 20 of a vehicle is operable to supply a conditioned air to one or more loads, such as a cabin 22 of the vehicle, at a proper temperature and pressure. An ECS 20 typically includes a multitude of various components which are packaged relatively close together to define an environmental control system pack 24. As shown, in an embodiment, the ECS 20 may also include at least one cabin air compressor (CAC) 26 positioned upstream from the ECS pack 24 relative to a flow of a first medium A1 through the ECS 20. A CAC 26 includes a compressor 28 that is driven by another component. As shown in FIG. 1A, the compressor 28 may be driven by a motor 30 operably coupled thereto. In the illustrated, non-limiting embodiment, the motor 30 is connected to the compressor 28 by a rotatable shaft 32. However, in other embodiments, such as shown in FIG. 1B, as an alternative to or in addition to the motor 30, the CAC 26 may include a turbine 33 operably coupled to the compressor 28 via the shaft 32. In such embodiments, energy extracted from a second medium A2 within the turbine 33 may be used to drive the compressor 28.

As shown, a first medium A1 is provided to an inlet 34 of the compressor 28. Within the compressor 28, the flow of the first medium A1 is compressed, causing the temperature and pressure of the first medium A1 to increase. A compressed first medium A1' is output from an outlet 36 of the compressor 28 to an inlet 38 of the ECS pack 24. The compressed first medium A1' may ultimately be provided to the cabin 22 of the vehicle, or alternatively, may be provided to another subsystem of the vehicle and/or exhausted overboard.

Figure 2:
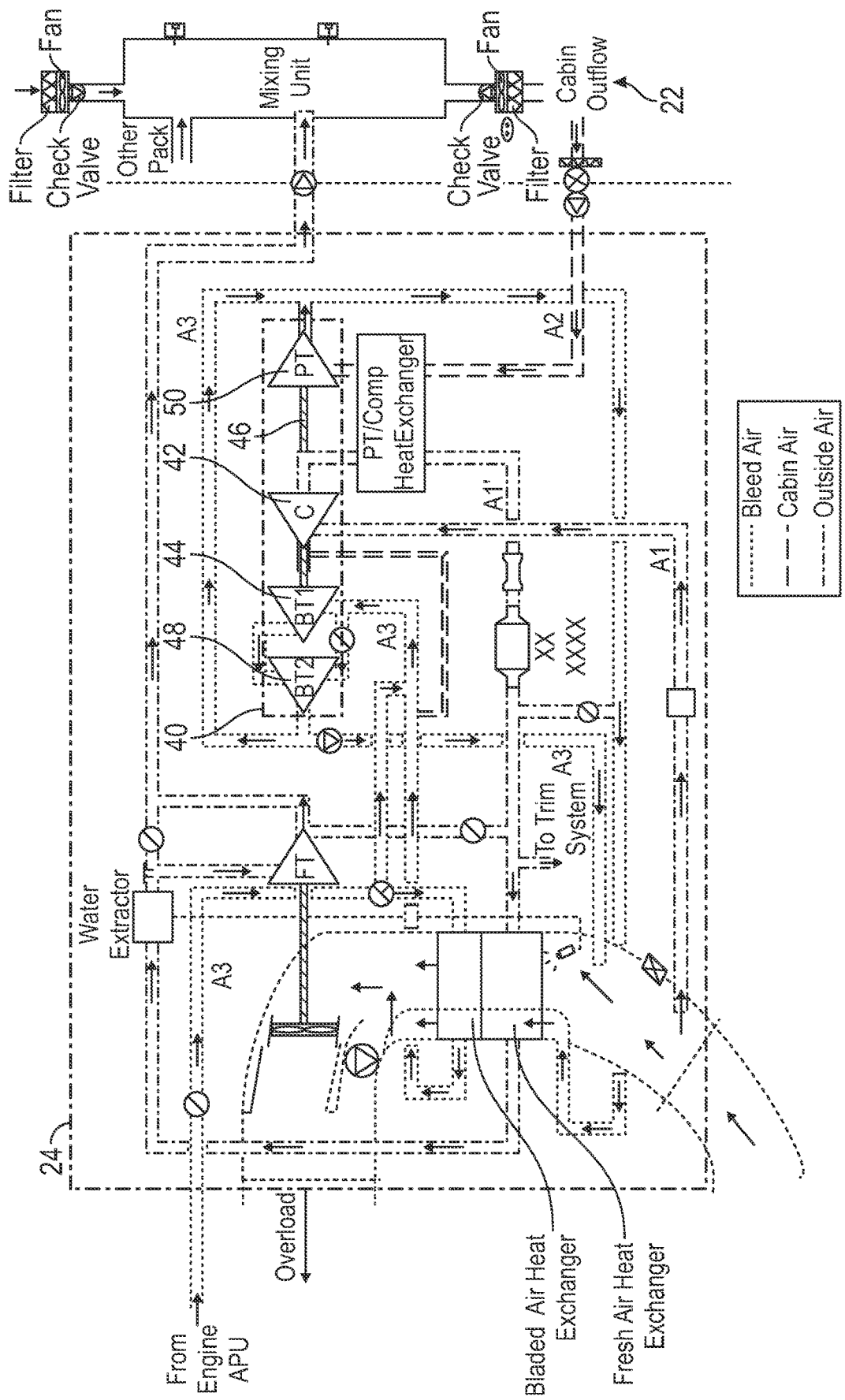
FIG. 2 is a schematic diagram of an environmental control pack of an aircraft according to an embodiment.
Figure 3:
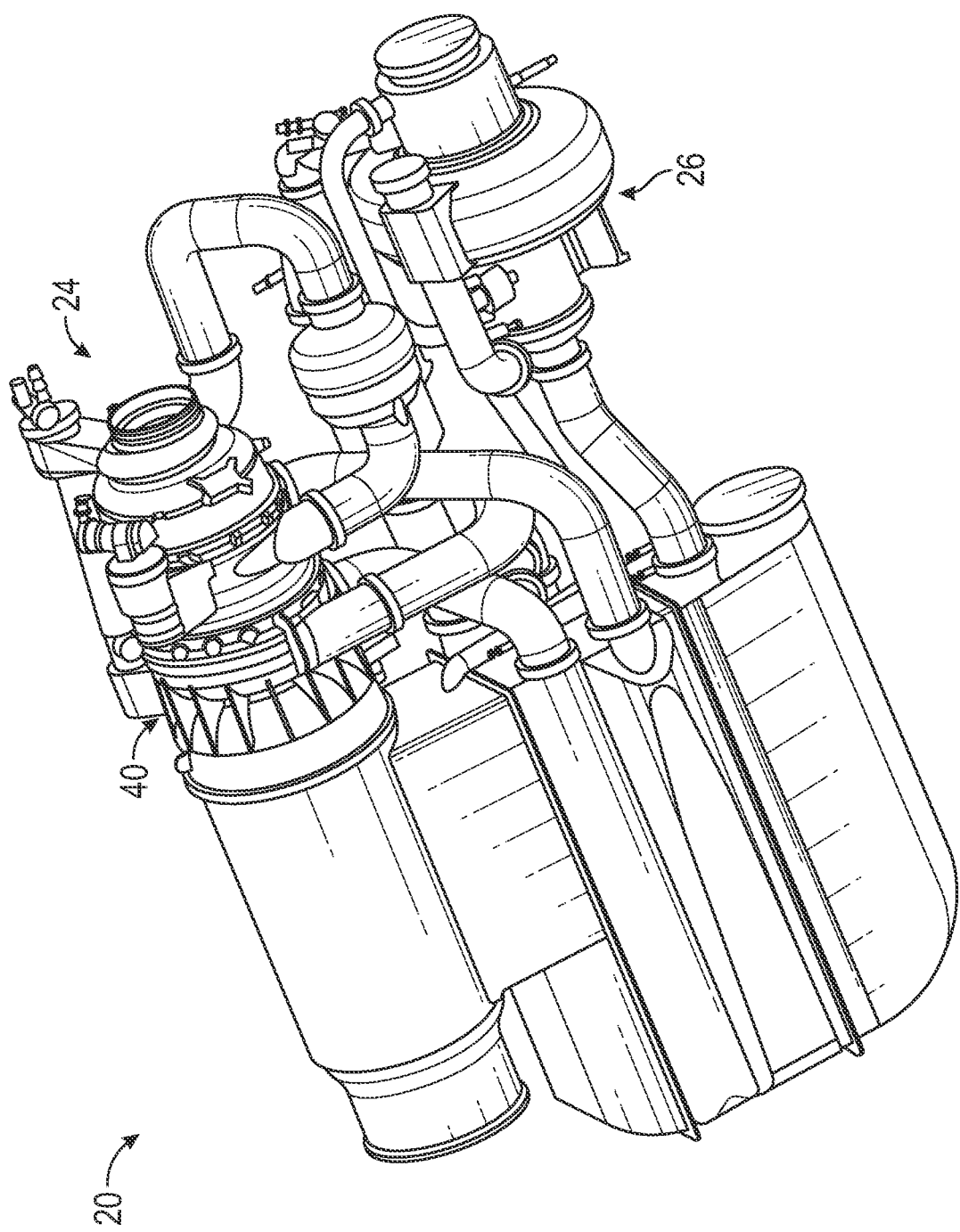
FIG. 3 is a perspective view of an environmental control system of a vehicle according to an embodiment.
Figure 4:
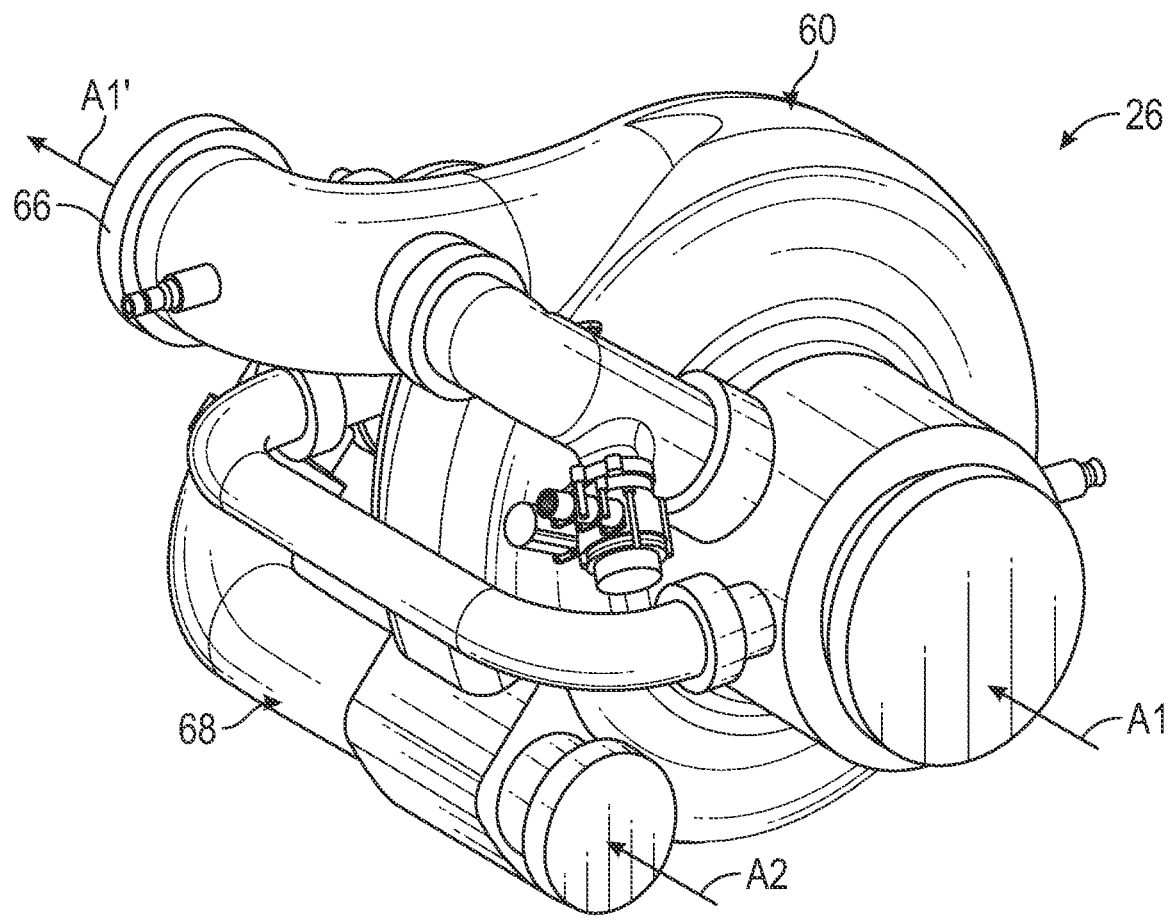
FIG. 4 is a detailed perspective view of a portion of the environmental control system of FIG. 3.
Figure 5:
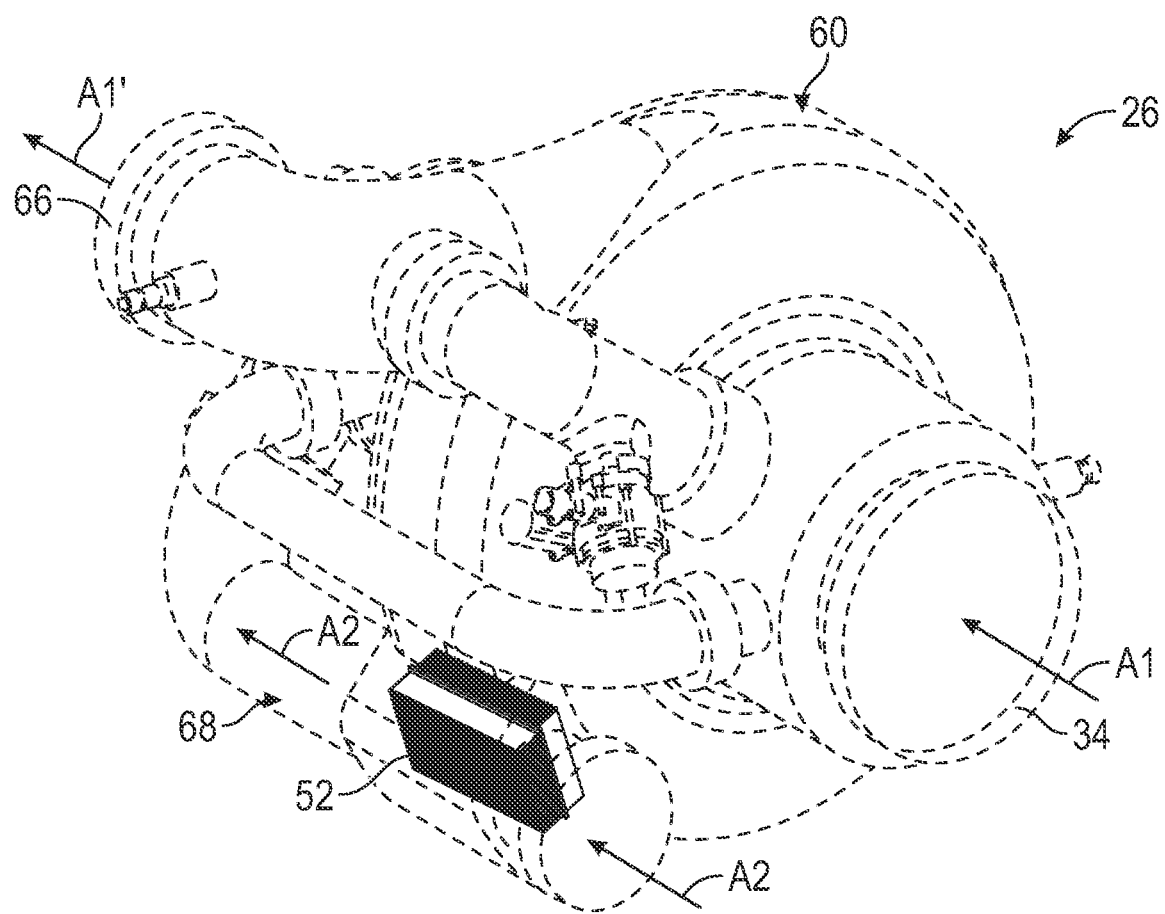
FIG. 5 is a perspective view of a heat exchanger associated with a portion of the environmental control system of FIG. 4 according to an embodiment.
Figure 6:
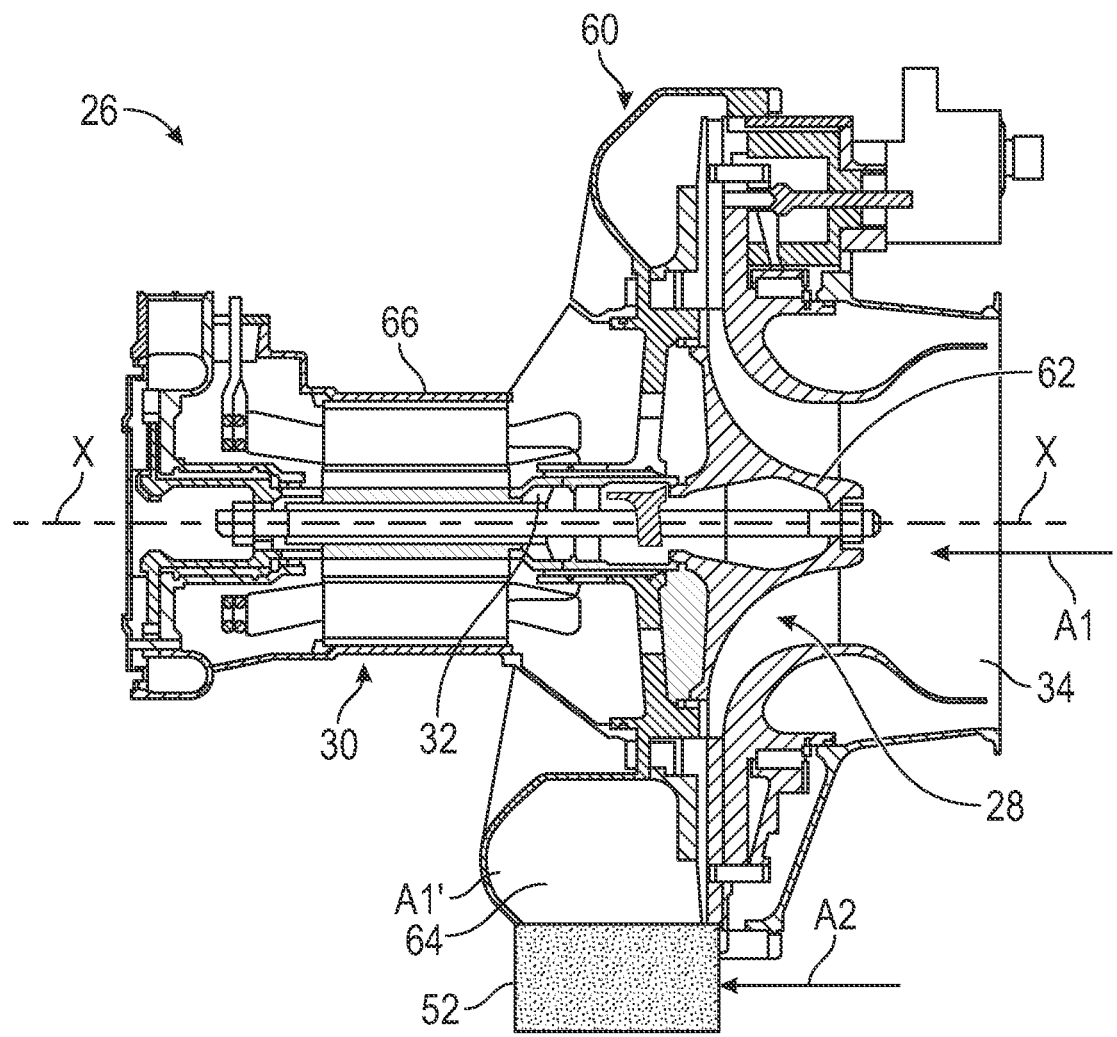
FIG. 6 is a schematic cross-sectional diagram of the heat exchanger associated with a portion of the environmental control system according to an embodiment.

With reference now to FIGS. 2 and 3, an example of an ECS pack 24 is illustrated in more detail. It should be appreciated that the ECS pack 24 may, but need not be used in combination with the one or more CACs 26 as previously described. As shown, the ECS pack 24 may include a thermodynamic device 40. The thermodynamic device 40 is a mechanical device that includes components for performing thermodynamic work on a medium (e.g., extracts work from or applies work to the medium A by raising and/or lowering pressure and by raising and/or lowering temperature). Examples of a thermodynamic device 40 include an air cycle machine, a two-wheel air cycle machine, a three-wheel air cycle machine, a four-wheel air cycle machine, etc.

As shown, the thermodynamic device 40, also referred to herein as an air cycle machine, may include a compressor 42 and at least one turbine 44 operably coupled by a shaft 46.

In an embodiment, the thermodynamic device 40 includes a plurality of turbines, such as three turbines 44, 48, 50 for example. In such embodiments, a medium may be configured to flow through at least two of the turbines 44, 48 in series, or alternatively, in parallel. Although a thermodynamic device 40 having three turbines 44, 48, 50 is illustrated, it should be appreciated that an ECS pack 24 including a thermodynamic device 40 having a single turbine, two turbines, or more than three turbines is also contemplated herein.

A compressor 42 is a mechanical device configured to raise a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. A turbine, such as any of turbines 44, 48, and 50 for example, is a mechanical device that expands a medium and extracts work therefrom (also referred to as extracting energy) to drive the compressor 42 via the shaft 46.

With continued reference to FIG. 2, in an embodiment, the compressor 42 of the thermodynamic device 40 is configured to receive a first medium A1 whereas a second or different type of medium A2 may be provided to at least one of the turbines 44, 48, 50. It should be appreciated that in embodiments where the ECS includes the CAC 26 and the ECS pack 24 including the thermodynamic device the compressed first medium A1' output from the CAC 26 may be the first medium A1 ultimately provided to the compressor 42 of the thermodynamic device 40.

In an embodiment, such as where the environmental control system 20 is used in an aircraft application, the first medium A1 is fresh air, such as outside air for example. The outside air can be procured via one or more scooping mechanisms, such as an impact scoop or a flush scoop for example. In an embodiment, the first medium A1 is ram air drawn from a portion of a ram air circuit. Generally, the fresh or outside air as described herein is at an ambient pressure equal to an air pressure outside of the aircraft when the aircraft is on the ground and is between an ambient pressure and a cabin pressure when the aircraft is in flight. However, embodiments where the first medium is air provided from another source, such as bleed air for example, are also within the scope of the disclosure. In the illustrated, non-limiting embodiment, the second type of medium A2 is provided from another source of the vehicle. For example, in an embodiment, the second medium A2 is cabin discharge air, which is air leaving the cabin 22 and that would typically be discharged overboard.

In some embodiments, a third medium A3 may be provided to another of the plurality of turbines 44, 48, 50 of the thermodynamic device 40. In such embodiments, the third medium A3 may be bleed air, which is pressurized air originating from, i.e., being "bled" from, an engine or auxiliary power unit of the aircraft. It shall be understood that one or more of the temperature, humidity, and pressure of the bleed air can vary based upon the compressor stage and revolutions per minute of the engine or auxiliary power unit from which the air is drawn.

Although not described herein, it should be understood that the ECS pack 24 includes several other components including a ram air circuit having at least one ram air heat exchanger, and a water extractor. Further, the ECS pack 24 illustrated and described herein is intended as an example only. Accordingly, an ECS pack 24 with any suitable configuration is within contemplated herein.

To optimize the extraction of energy from the second medium A2 within the turbine 33 or 50 and/or to minimize the risk of moisture within the second medium A2 forming into ice at the turbine 33, 50, the second medium A2 may be heated at a location at or upstream from the inlet of the turbine 33, 50 (see FIG. 1B). To heat the second medium A2 at or upstream from the turbine 33, 50, the second medium A2 is arranged in a heat transfer relationship with another medium of the ECS 20, such as the compressed first medium A1'. In the illustrated, non-limiting embodiment of FIGS. 1B and 3-6, the second medium A2 is arranged in a heat transfer relationship with the compressed first medium A1' generated by the compressor 28 of the CAC 26. However, it should be understood that in other embodiments, the second medium A2 may be arranged in a heat transfer relationship with the compressed first medium A1' generated by the compressor 42 of the thermodynamic device 40 of the ECS pack 24.

The second medium A2 may be arranged in a heat transfer relationship with the compressed first medium A1' via a heat exchanger 52. The heat exchanger 52 may be fluidly connected to a portion of the compressor 28 and to the conduit 68 configured to receive a flow of the second medium A2. In an embodiment, best shown in FIGS. 5 and 6, the heat exchanger 52 is mounted at or adjacent to the housing 60 of the compressor, such as compressor 28. In the illustrated, non-limiting embodiment, the heat exchanger 52 is positioned at or downstream from both the rotating portion (including the impeller) 62 and the volute 64 of the compressor 28 such that the flow provided to the heat exchanger 52 is compressed first medium A1' having an increased temperature and/or pressure relative to the first medium A1 provided to the inlet 34 of the compressor 28. In other embodiments, the heat exchanger 52 may be located at any suitable location about the compressor housing 60 between the outlet or downstream end of the rotating portion 62 and the outlet 66 of the compressor housing 60.

In some embodiments, the heat exchanger 52 is integrally formed with a portion of the compressor housing 60 of the compressor 28. In other embodiments, the heat exchanger 52 is permanently or removably coupled to the compressor housing 60, such as via a plurality of fasteners for example.

Figure 7:
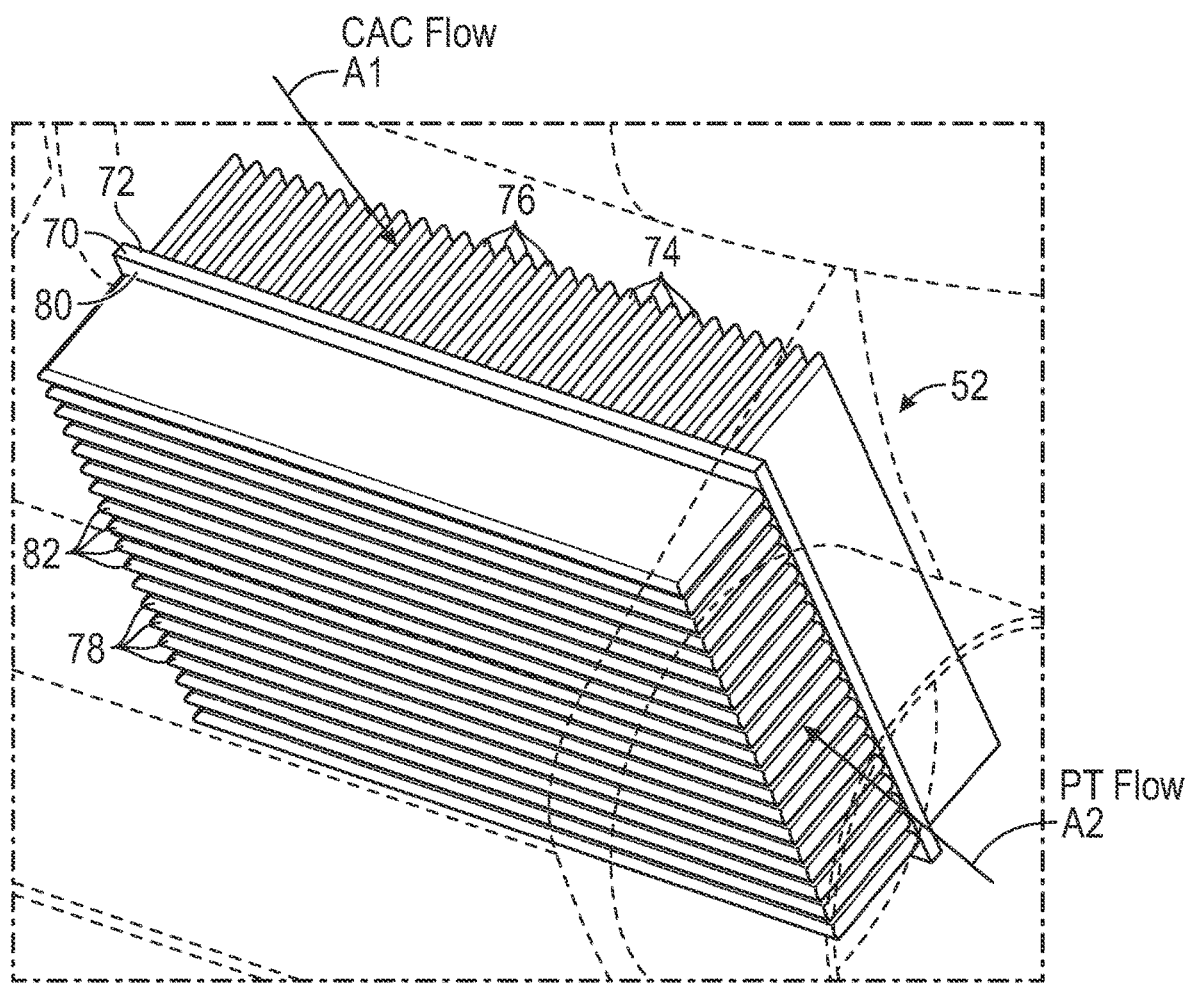
FIG. 7 is a detailed perspective view of the heat exchanger associated with a portion of the environmental control system according to an embodiment.

With reference to FIG. 7, an example of the heat exchanger 52 is illustrated in more detail. In an embodiment, the heat exchanger 52 includes a centrally located plate 70. The centrally located plate 70 may form a portion of the compressor housing 60, or alternatively or additionally, may form a portion of the wall of the conduit 68 through which a flow of the second medium A2 passes. Although the plate 70 is illustrated as having a planar configuration, it should be understood that in other embodiments the plate 70 may have another configuration. For example, at least a first side 72 of the plate 70 may be curved in a manner complementary to the flow provided at the outlet of the rotating portion 62, or to the volute 64 of the compressor housing 60.

In an embodiment, at least one fin 74, such as a plurality of first fins for example, extends from a first side 72 of the plate 70 into the interior of the compressor housing 60. The plurality of first fins 74 extending from the plate 70 may be used to define a plurality of channels 76 through which the compressed first medium A1' will flow. Although the plurality of first fins 74 are illustrated as being generally rectangular in shape, it should be understood that first fins 74 having another shape are also within the scope of the disclosure. For example, because of the circular flow of the compressed first medium A1' within a portion of the compressor housing 60, the first fins 74 may have an arcuate contour complementary to the flow path. Furthermore, although each of the plurality of first fins 74 is illustrated as being substantially identical, embodiments where a configuration of one or more of the first fins 74 varies relative to the remainder of the first fins are also within the scope of the disclosure.

Alternatively, or in addition, at least one fin 78, such as a plurality of second fins for example, extend from a second side 80 of the plate 70 into the flow path of the second medium A2 defined by the conduit. The plurality of second fins 78 extending from the plate 70 may be used to define a plurality of channels 82 through which the cooler second medium A2 will flow. In the illustrated, non-limiting embodiment, the plurality of second fins 78 may be oriented parallel to the flow of the second medium A2. However, embodiments where the channels 82 defined between the second fins 78 have a non-linear configuration, such as to increase the surface area and therefore the heat transfer at the second fins 78 is also within the scope of the disclosure.

In an embodiment, one or both of the plurality of first and/or second fins 74, 76 include aerodynamic contouring of a leading edge thereof to minimize the pressure drop of a respective fluid flow across the heat exchanger 52. Alternatively, or in addition, the first and/or second plurality of fins 74, 78 may include a surface finish and/or another feature for enhancing the heat transfer that occurs within the heat exchanger 52.

It should be understood that the heat exchanger 52 illustrated and described herein is intended as an example only and that a heat exchanger 52 having another suitable configuration is also contemplated herein. Further, the heat exchanger 52 may be formed from a lightweight material, such as aluminum for example, via any of a number of manufacturing processes, including but not limited to casting, or additive manufacturing.

Integration of the heat exchanger 52, such as used to heat a flow of medium to be provided to the power turbine of an air cycle machine for example, into the compressor housing 60 reduces the complexity of the ECS 20 as well as the overall installed system volume and weight. Further, such a configuration eliminates the need for a hot or high-pressure side ducting, coupling, and header.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodi-

What is claimed is:

1. An environmental control system of a vehicle comprising:
   a compressor having a compressor housing including a compressor inlet configured to receive a first medium, and a compressor outlet, wherein a compressed first medium is provided at the compressor outlet, a rotating portion arranged within the compressor housing, and a volute formed within the compressor housing;
   a conduit configured to receive a second medium; and
   a heat exchanger mounted to the compressor housing at a location between the compressor outlet and one of the rotating portion and the volute, wherein the heat exchanger is fluidly connected to a portion of the compressor and to the conduit.

2. The environmental control system of claim 1, wherein the heat exchanger is integrally formed with the compressor housing.

3. The environmental control system of claim 1, wherein the heat exchanger further comprises a plate and at least one fin extending from the plate.

4. The environmental control system of claim 3, wherein the at least one fin includes a plurality of first fins, the plurality of first fins being arranged within the compressor housing.

5. The environmental control system of claim 4, wherein the at least one fin further comprises a plurality of second fins, the plurality of second fins being arranged within the conduit.

6. The environmental control system of claim 3, wherein the at least one fin includes a plurality of second fins, the plurality of second fins being arranged within the conduit.

7. The environmental control system of claim 1, wherein the compressor is part of a cabin air compressor.

8. The environmental control system of claim 1, wherein the compressor is part of a thermodynamic device.

9. The environmental control system of claim 1, wherein the first medium is fresh air.

10. The environmental control system of claim 1, wherein the second medium is cabin air.

11. The environmental control system of claim 1, wherein the vehicle is an aircraft.

12. A method of operating an environmental control system of a vehicle comprising:
    compressing a first medium at a compressor to form a compressed first medium;
    extracting energy from a second medium at a turbine; and
    heating the second medium within a heat exchanger using the compressed first medium, wherein the heating the second medium occurs prior to the extracting energy from the second medium, the compressor having a compressor housing, a rotating portion arranged within the compressor housing, and a volute formed within the compressor housing, the heat exchanger being mounted to the compressor housing at a location between the compressor outlet and one of the rotating portion and the volute.

13. The method of claim 12, wherein the first medium is fresh air.

14. The method of claim 12, wherein the second medium is cabin air.

15. The method of claim 12, further comprising providing the compressed first medium to an environmental control system pack, the environmental control system pack being located downstream from the compressor relative to a flow of the first medium.

16. The method of claim 12, further comprising providing the first medium to an environmental control system pack, wherein the compressor is part of the environmental control system pack.

17. The method of claim 12, wherein the vehicle is an aircraft.

18. An environmental control system of a vehicle comprising:
    a compressor having a compressor housing including a compressor inlet configured to receive a first medium, and a compressor outlet, wherein a compressed first medium is provided at the compressor outlet;
    a conduit configured to receive a second medium; and
    a heat exchanger integrally formed with the compressor housing, wherein the heat exchanger is fluidly connected to a portion of the compressor and to the conduit.

* * * * *